United States Patent

Ogata et al.

[11] Patent Number: 5,956,166
[45] Date of Patent: Sep. 21, 1999

[54] WAVELENGTH DIVISION MULTIPLEXING OPTICAL TRANSMISSION SYSTEM AND WAVELENGTH DIVISION MULTIPLEXING OPTICAL TRANSMISSION METHOD

[75] Inventors: Takaaki Ogata; Yukio Michishita, both of Tokyo, Japan

[73] Assignee: NEC Corporation, Japan

[21] Appl. No.: 08/692,958

[22] Filed: Aug. 7, 1996

[30] Foreign Application Priority Data

Aug. 9, 1995 [JP] Japan ................................ 7-202646

[51] Int. Cl.$^6$ .................................................. H04J 14/02
[52] U.S. Cl. ........................................... 359/125; 359/133
[58] Field of Search ................................. 359/124, 125, 359/133

[56] References Cited

U.S. PATENT DOCUMENTS

| | | | |
|---|---|---|---|
| 4,896,934 | 1/1990 | Arthurs et al. | 359/121 |
| 5,093,743 | 3/1992 | Eng et al. | 359/120 |
| 5,365,361 | 11/1994 | Noll et al. | 359/161 |
| 5,418,782 | 5/1995 | Wasilewski | 370/73 |
| 5,504,608 | 4/1996 | Neeves et al. | 359/124 |
| 5,612,806 | 3/1997 | Su et al. | 359/125 |

OTHER PUBLICATIONS

Dono et al, A Wavelength Division Multiple Access Network for Computer Communication, IEEE, vol. 8, No. 6, pp. 983–993, Aug. 1990.

Maeda et al, WDM Access Network based on Centralized Common Wavelength Control, Optical Fiber Conference, Tuesday, pp. 84–85, Mar. 1992.

*Primary Examiner*—Leslie Pascal
*Attorney, Agent, or Firm*—Ostrolenk, Faber, Gerb & Soffen, LLP

[57] ABSTRACT

At a transmission section, different frequencies ranging from f1 to fn corresponding to n channels are generated as channel information, respectively. The signal light ($\lambda 1$ to $\lambda n$) of each channel is modulated at the corresponding frequency (f1 to fn) and multiplexed. At a reception section, in case of selecting the channel of the signal light $\lambda 1$, the wavelength selection characteristic of a filter is sweep controlled for detecting the frequency f1. The wavelength selection characteristic at the f1 detection is kept as the wavelength selection characteristic of the filter.

13 Claims, 3 Drawing Sheets

WAVELENGTH DIVISION MULTIPLEXING OPTICAL TRANSMISSION SYSTEM AND WAVELENGTH DIVISION MULTIPLEXING OPTICAL TRANSMISSION METHOD

BACKGROUND OF THE INVENTION

The present invention relates to a wavelength division multiplexing optical transmission system and, more particularly, to an art for selecting a signal light of any desired channel therein.

In an optical communication field, a wavelength division multiplexing (WDM) optical transmission system has been studied for systematizing a large capacity communication system allowing for a large transmission capacity. This transmission system through wavelength division multiplexing is provided with a plurality of signal light sources, each of the signal light sources has a different wavelength in order to increase the signal transmission capacity. The signal speed of each channel is independently set, which has been highly expected to be put into an industrial use in near future.

FIG. 3 is a block diagram of a construction of a conventional wavelength division multiplexing optical transmission system as described above.

In FIG. 3, signal light sources 2-1 to 2-n are provided with the respective channels for generating signal lights having different wavelength $\lambda 1$ to $\lambda n$ corresponding to the respective channels.

A reference numeral 8 is a modulator for data modulating the signal light sources 2-1 to 2-n.

A reference numeral 3 is a multiplexer comprising a coupler or the like for wavelength multiplexing each signal light having different wavelength $\lambda 1$ to $\lambda n$, which is transmitted to an optical transmission path 4 consisting of an optical fiber.

A reference numeral 5 is a wavelength division unit for dividing the wavelength of the wavelength multiplexing light via the optical transmission path 4.

Reference numerals 6-1 to 6-n are filters for receiving each wavelength multiplexing light which has been wavelength divided in the wavelength division unit 5. In accordance with the wavelength ranging from $\lambda 1$ to $\lambda n$ of the respective filters 6-1 to 6-n, the signal light of a predetermined wavelength is selectively permeated.

Reference numerals 7-1 to 7-n are optical detectors for receiving outputs of the corresponding filters 6-1 to 6-n, respectively. The optical detectors 7-1 to 7-n detect the signal light of the predetermined channel (wavelength).

In the above-constructed wavelength division multiplexing optical transmission system, each of filters 6-1 to 6-n at a reception section is preliminarily set and fixed to have a wavelength selection characteristic so as to select a signal light of a predetermined channel. In the conventional transmission system as described above, light sources 2-1 to 2-n at a transmission section and optical detectors 7-1 to 7-n at a reception section are fixedly correlated and defined by the wavelength selection characteristics of filters 6-1 to 6-n. Once each correlation between the light source and the optical detector is defined, any further selection of the desired correlation is not allowed.

SUMMARY OF THE INVENTION

It is an object of the present invention to provide an art for solving the aforementioned problems.

It is another object of the present invention to provide an art allowing for selection of the desired correlation between the light source and an optical detector and improving a degree of freedom in channel selection.

The objects of the present invention is achieved by a wavelength division multiplexing optical transmission system comprising: a transmission section having: signal light generation means for generating a plurality of signal lights, each of said signal lights has a different wavelength in accordance with each channel; and multiplexing means for multiplexing said signal lights into a transmission signal light and transmitting said transmission signal light to an optical transmission path, and a reception section having: wavelength division means for wavelength dividing said transmission signal light that has been received; filter means for selecting a signal light of a predetermined channel among transmission signal lights from said wavelength division means in accordance with a wavelength selection characteristic controlled based on a control signal; and control means for generating said control signal that controls said wavelength selection characteristic so that a signal light of said predetermined channel is selected.

The present invention is characterized in that the wavelength selection characteristic of the filter can be variably controlled in accordance with the selected channel.

In order to control the wavelength selection characteristic, at the transmission section, the signal light of each channel is modulated with channel information, i.e., the frequency corresponding to the channel through a predetermined modulation mode. As a result, each signal light is superimposed with the channel information. At the reception section, the modulation frequency as the channel information is detected. Based on the detected frequency, the wavelength selection characteristic of the wavelength variable filter is controlled. This allows for selectively receiving the signal light of the desired channel.

Alternatively the wavelength selection characteristics of the wavelength variable filter at the reception section can be externally controlled based on the channel information. As a result, the signal light of the desired channel can be selectively received.

BRIEF DESCRIPTION OF THE DRAWINGS

This and other objects, features and advantages of the present invention will become more apparent upon a reading of the following detailed description and drawings, in which.

DESCRIPTION OF THE PREFERRED EMBODIMENTS

A first embodiment is hereinafter described.

Figure 1:
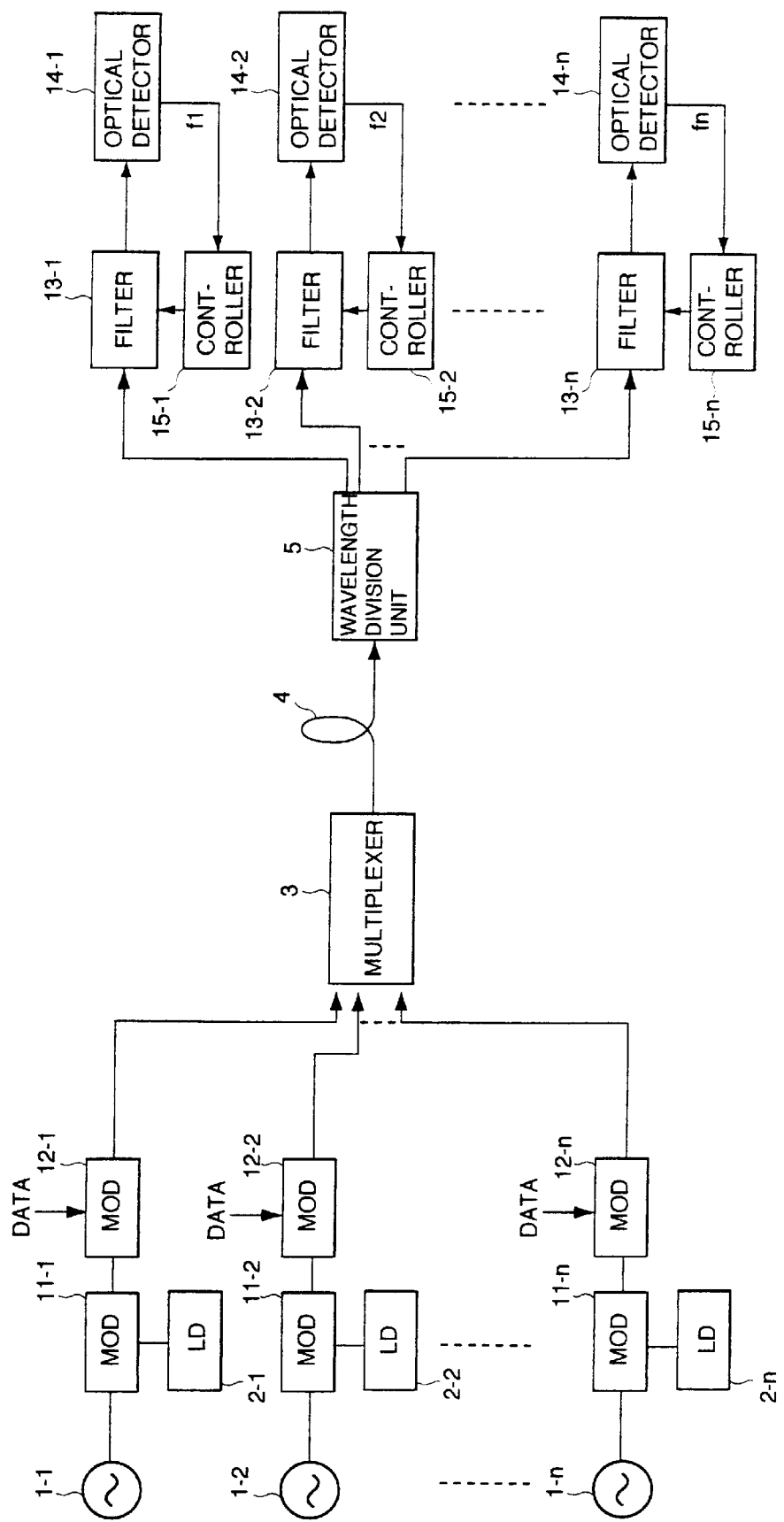
FIG. 1 is a block diagram of a first embodiment.
Figure 3:
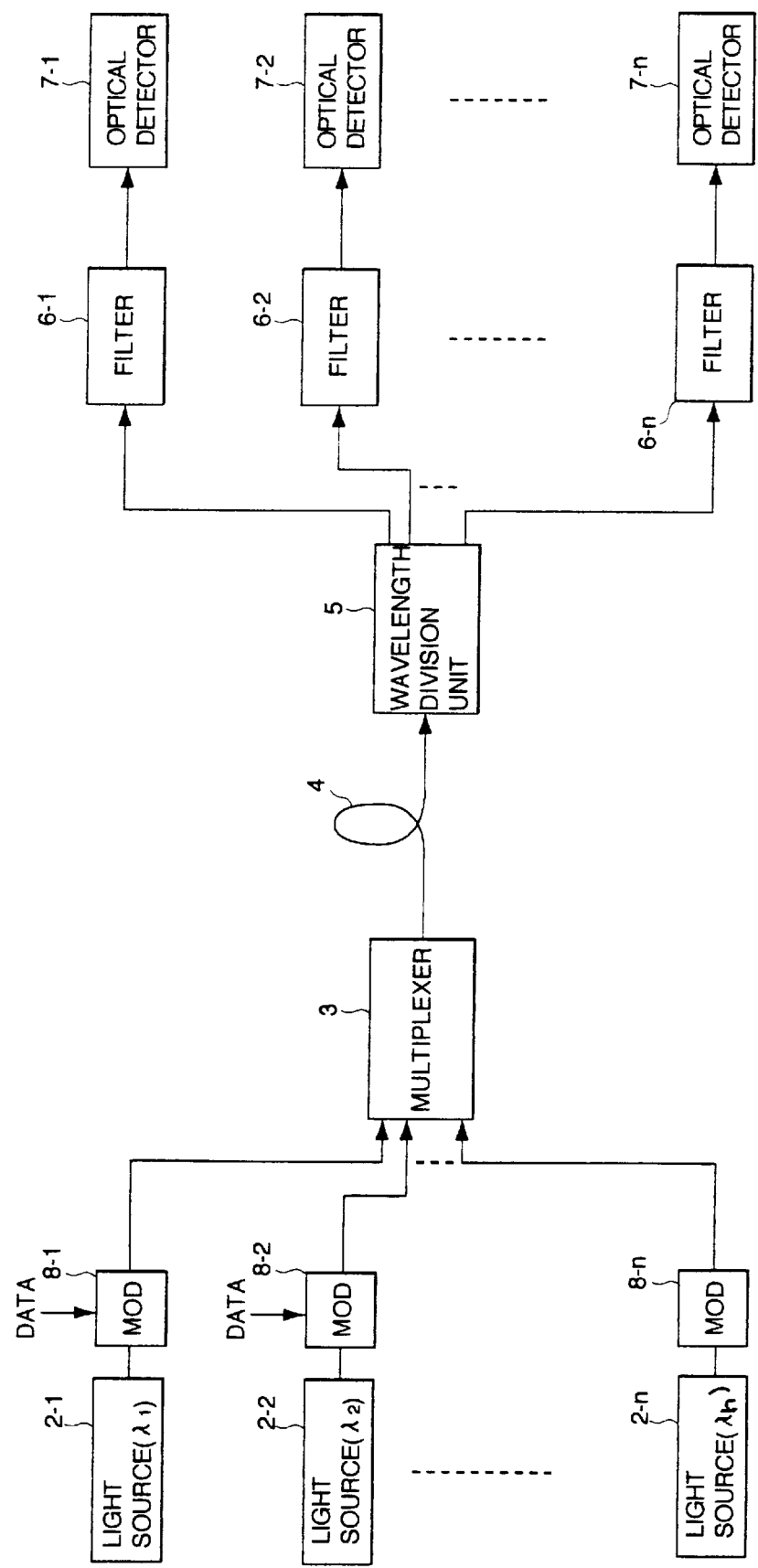
FIG. 3 is a block diagram of a prior art.

FIG. 1 is a block diagram of an embodiment of the present invention. The parts equivalent to those shown in FIG. 3 are designated as the same reference numerals as those in FIG. 3.

In FIG. 1, reference numerals 1-1 to 1-n are oscillators, each of the oscillators is provided with the corresponded channel, respectively. The oscillators 1-1 to 1-n ocsillate signals at frequencies f1 to fn corresponding to the respective channels. Each frequency of f1 to fn is referenced as channel information for identifying each channel.

Reference numerals 2-1 to 2-n are laser light sources, each of the laser light sources is provided with the corresponding channel. Each of the laser light sources 2-1 to 2-n generates the signal light having different wavelength λ1 to λn at every channel.

Reference numerals 11-1 to 11-n are first modulators, each of the modulators is provided with the corresponding channel.

The modulators 11-1 to 11-n amplitude modulate signal lights of the laser light sources 2-1 to 2-n at the respective frequencies f1 to fn.

Reference numerals 12-1 to 12-n are second modulators, each of the second modulators is provided with the corresponding channel. The second modulators 12-1 to 12-n modulate signal lights of the first modulators 11-1 to 11-n with data signals, respectively.

Being modulated, the signal light is wavelength multiplexed in the multiplexer 3, from which the signal light corresponding to n channel is transmitted to one optical transmission path 4.

The construction of the transmission section has been described as above.

The construction of the reception section is hereinafter described.

A reference numeral 5 is a wavelength division unit for wavelength dividing the signal light received from the optical transmission path 4, which is supplied to each of the wavelength variable filters 13-1 to 13-n, respectively.

Reference numerals 13-1 to 13-n are wavelength variable filters in which wavelength selection characteristics can be varied through control of the respective controllers 15-1 to 15-n (described later).

Reference numerals 14-1 to 14-n are optical detectors for receiving an input of each signal light which has been selectively permeated through the variable filters 13-1 to 13-n, respectively. Each of the optical detectors 14-1 to 14-n has a function (not shown) for selectively extracting a superimposing frequency f1 to fn as the channel information indicating the desired channel desired for reception. This function can be easily realized by means of a filter or the like. The extracted frequency f1 to fn as the channel information is supplied to the corresponding controller 15-1 to 15-n (described later).

Reference numerals 15-1 to 15-n are controllers for generating control signals which control the variable filters 13-1 to 13-n so that the wavelength (λ1 to λn) of the corresponding channel is selected in accordance with the frequency f1 to fn which has been input.

For example, in case a channel number i is desired to be received by an optical detector 14-1, frequency selection function (filter characteristic) of the optical detector 14-1 is preset so as to selectively detect the frequency fi corresponding to the channel i. The controller 15-1 executes a sweep control so that, for example, the initial selection wavelength of the variable filter 13-1 has the shortest wavelength among all the channels.

When the frequency fi corresponding to the desired channel is received with the frequency selection function of the optical detector 14-1, a detection signal of the frequency fi is sent to the controller 15-1. The controller 15-1 immediately suspends the sweep control and starts controlling to keep the wavelength selection characteristic of the variable filter 13-1 onward.

The rest of the controllers 15-2 to 15-n likewise control wavelength selection of the variable filters. In this embodiment, signal light of each channel (λ1 to λn) is amplitude modulated with each transmission frequency f1 to fn (channel information of the oscillators 1-1 to 1-n). However other mode such as frequency modulation, phase modulation or the like is also available.

In the first embodiment, laser lights from the laser light sources 2-1 to 2-n are modulated with the modulators 11-1 to 11-n, respectively. However, it is possible to directly modulate them by inputting the signals from the oscillators 1-1 to 1-n to the laser light sources 2-1 to 2-n, respectively.

Next the second embodiment is described.

Figure 2:
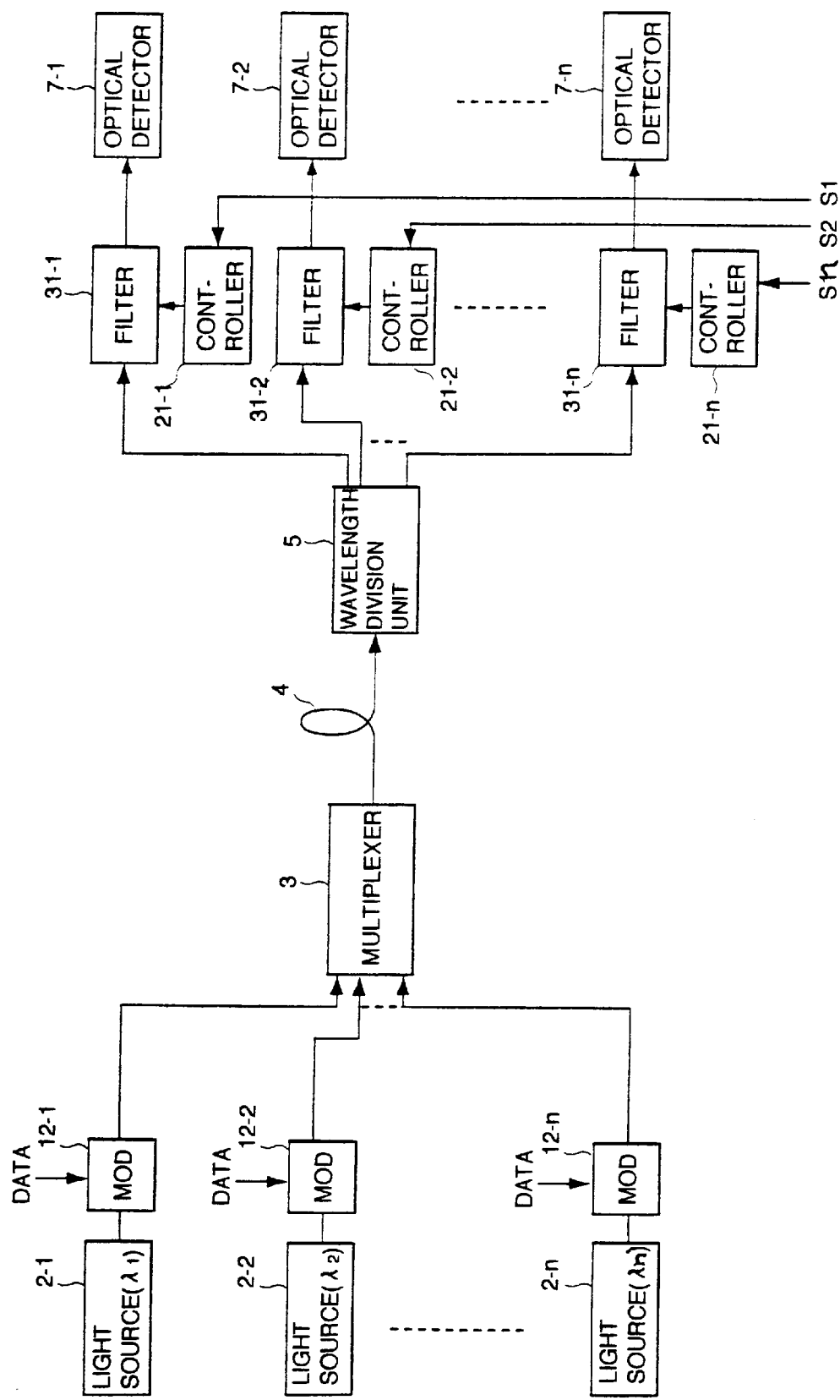
FIG. 2 is a block diagram of a second embodiment.

FIG. 2 is a block diagram of another embodiment of the present invention. The equivalent parts to those shown in FIGS. 1 and 3 are designated as the same reference numerals. Therefore different parts from those of the first embodiment are described.

Controllers 21-1 to 21-n for controlling the respective wavelength selection characteristics of the wavelength variable filters 31-1 to 31-n are actuated by external channel selection control signals (S1 to Sn), respectively.

Each of the optical detectors 7-1 to 7-n is not required to have a filter function for selectively extracting the superimposing frequency S1 to Sn as the channel information compared with the embodiment shown in FIG. 1. This embodiment uses the optical detector which is similar to that of the prior art shown in FIG. 3.

In this embodiment, if the channel number i is desired to be received by the optical detector 7-1, a control signal (Si) corresponding to the channel i is input to the controller 21-1 to 21-n. The controllers 21-1 to 21-n have recorded the wavelength selection characteristics corresponding to the respective selection control signals (S1 to Sn). For example, the control signal (fi) is input, the controller is so constructed to control to set the wavelength selection characteristic of the variable filter 31-1 to λi.

The rest of the controllers 21-2 to 22-n likewise control the wavelength selection characteristics of the variable filters 31-2 to 31-n, respectively in accordance with the control signals as the external channel information.

In the present invention, the modulated channel information is superimposed on the signal light wavelength for transmission. As a result, the reception section is allowed to select a signal light of any wavelength in accordance with the channel information, leading to improved freedom in selection and wider range of use.

Moreover, modulating the signal light also provides an additional effect of inhibiting an adverse action of SBS (Stimulated Brilouin Scattering) owing to a non-linearity of the optical fiber on the transmission path.

What is claimed is:

1. A wavelength division multiplexing optical transmission system comprising:

a transmission section having:

signal light generation means for generating a plurality of signal lights, each of said signal lights having a different wavelength in accordance with each channel;

channel information generation means for generating channel information for channel identification at each of said channel;

channel information superimposing means for superimposing said channel information on a signal light of a corresponding channel; and multiplexing means for multiplexing said signal lights into a transmission signal light and transmitting said transmission signal light to an optical transmission path, and a reception section having:

wavelength division means for wavelength dividing said transmission signal light that has been received;

filter means for selecting a signal light of a predetermined channel among transmission signal lights from said wavelength division means in accordance with a wavelength selection characteristic that is controlled based on a control signal; and control means for generating said control signal in response to said channel information superimposed on said signal light, said control signal controlling said wavelength selection characteristic so that a signal light of said predetermined channel is selected.

2. The wavelength division multiplexing optical transmission system of claim 1, wherein said control means comprises means for storing wavelength selection characteristics corresponding to respective channels and controlling said filter to set a wavelength selection characteristic of said predetermined channel.

3. The wavelength division multiplexing optical transmission system of claim 1, wherein said reception section further comprises detection means for detecting said channel information from among signal lights output from said filter means, and said control means comprises means for controlling to change wavelength selection characteristics of said filters sequentially so that said detection means detects the channel information of a predetermined channel, and once said detection means detects said channel information, keeps said wavelength selection characteristic at detection.

4. The wavelength division multiplexing optical transmission system of claim 1, wherein said channel information generation means comprises means for generating a signal at a different frequency in accordance with said each channel, and said channel information superimposing means comprises means for modulating a signal light with a signal at a corresponding frequency based on a predetermined modulation mode.

5. The wavelength division multiplexing optical transmission system of claim 4, wherein said modulation means comprises means for amplitude modulating a signal light with a signal at a corresponding frequency.

6. The wavelength division multiplexing optical transmission system of claim 4, wherein said modulation means comprises means for frequency modulating a signal light with a signal at a corresponding frequency.

7. The wavelength division multiplexing optical transmission system of claim 4, wherein said modulation means comprises means for phase modulating a signal light with a signal at a corresponding frequency.

8. A wavelength division multiplexing optical transmission system comprising:

a transmission section having:

signal light generation means for generating a plurality of signal lights, each of said signal lights has a different wavelength in accordance with each channel;

means for generating signals at individual frequency in accordance with each channel; modulation means for modulating said signal light with a signal at a frequency of a corresponding channel based on a predetermined modulation mode; and multiplexing means for multiplexing said modulated signal lights into a transmission signal light and transmitting said transmissionsignal light to an optical transmission path, and a reception section having;

a wavelength division means for wavelength dividing said transmission signal light that has been received;

filter means for selecting a signal light of a predetermined channel from among transmission signal lights from said wavelength division means in accordance with a wavelength selection characteristic that is controlled based on a control signal;

detection means for detecting a frequency component in accordance with a predetermined channel from among signal lights output from said filter means; and control means for generating said control signal that controls changing said wavelength selection characteristic of said filter sequentially so that said detection means detects a frequency component of said predetermined channel and, once said detection means detects the frequency component of said predetermined channel, said control means keeps said wavelength selection characteristic for said predetermined channel.

9. The wavelength division multiplexing optical transmission system of claim 8, wherein said modulation means comprises means for amplitude modulating a signal light with a signal at a corresponding frequency.

10. The wavelength division multiplexing optical transmission system of claim 8, wherein said modulation means comprises means for frequency modulating a signal light with a signal at a corresponding frequency.

11. The wavelength division multiplexing optical transmission system of claim 8, wherein said modulation means comprises means for phase modulating a signal light with a signal at a corresponding frequency.

12. A wavelength division multiplexing optical transmission system comprising:

a transmission section having:

a signal light generation device generating a plurality of signal lights, each of said signal lights has a different wavelength in accordance with each channel; and channel information generator for generating channel information for channel identification at each of said channel;

channel information superimposer for superimposing said channel information on a signal light of a corresponding channel; and a multiplexer multiplexing said signal lights into a transmission signal light and transmitting said transmission signal light to an optical transmission path, and a reception section having:

a wavelength division device wavelength dividing said transmission signal light that has been received;

a filter selecting a signal light of a predetermined channel among transmission signal lights from said wavelength division device in accordance with a wavelength selection characteristic that is controlled based on a control signal; and a controller generating said control signal in response to said channel information superimposed on said signal light, said control signal controlling said wavelength selection characteristic so that a signal light of said predetermined channel is selected.

13. A wavelength division multiplexing optical transmission system comprising:

a transmission section having:
- a signal light generation device generating a plurality of signal lights, each of said signal lights has a different wavelength in accordance with each channel;
- a signal generating device generating signals at an individual frequency in accordance with each channel;
- a modulator modulating said signal light with a signal at a frequency of a corresponding channel based on a predetermined modulation mode; and
- a multiplexer multiplexing said modulated signal lights into a transmission signal light and transmitting said transmission signal light to an optical transmission path, and a reception section having:
- a wavelength division device wavelength dividing said transmission signal light that has been received;
- a filter selecting a signal light of a predetermined channel from among transmission signal lights from said wavelength division device in accordance with a wavelength selection characteristic that is controlled based on a control signal;
- a detector detecting a frequency component in accordance with a predetermined channel from among signal lights output from said filter; and
- controller generating said control signal that controls changing said wavelength selection characteristic of said filter sequentially so that said detector detects a frequency component of said predetermined channel and, once said detector detects the frequency component of said predetermined channel, said controller keeps said wavelength selection characteristic for said predetermined channel.

* * * * *